No. 691,663. Patented Jan. 21, 1902.
T. QUINN.
WHEEL CONTROLLING MECHANISM.
(Application filed Jan. 20, 1898.)

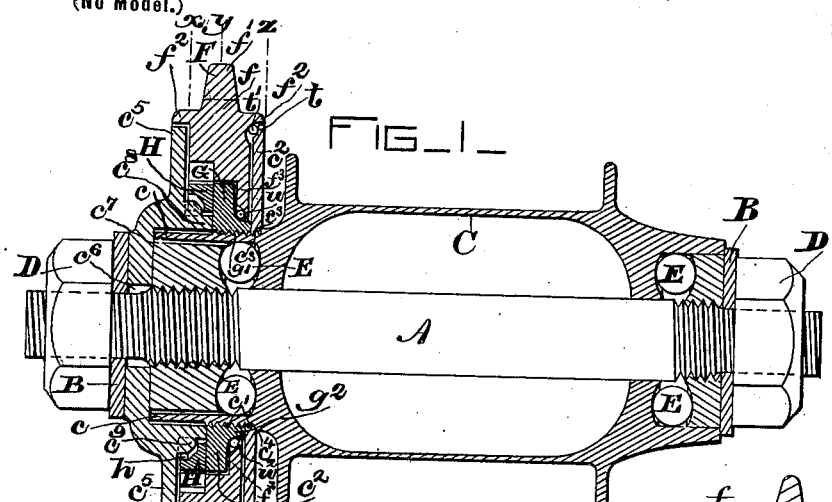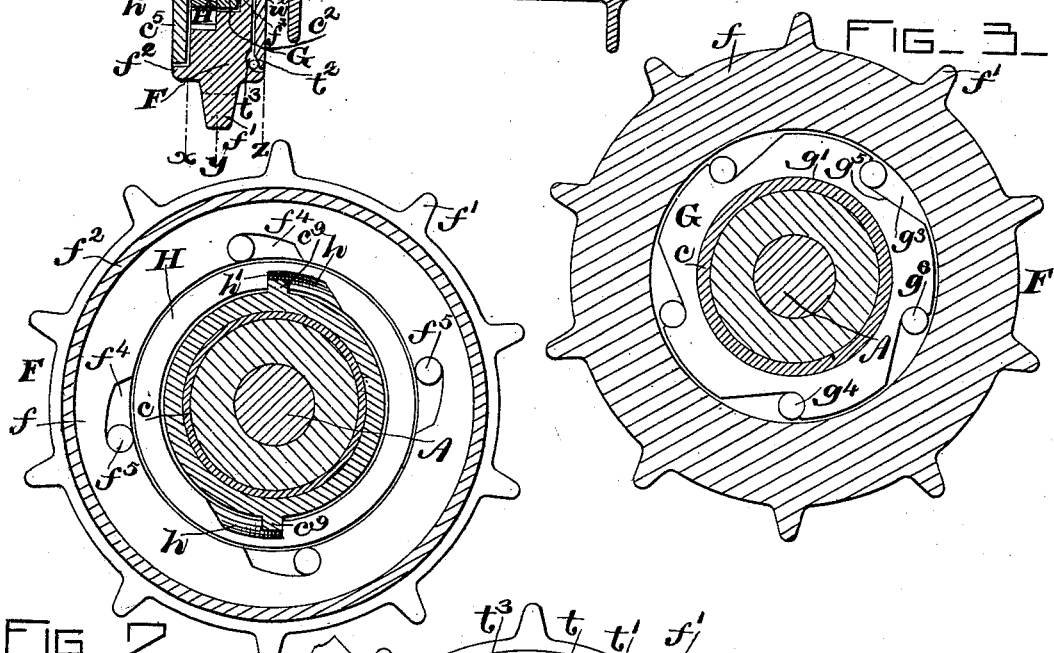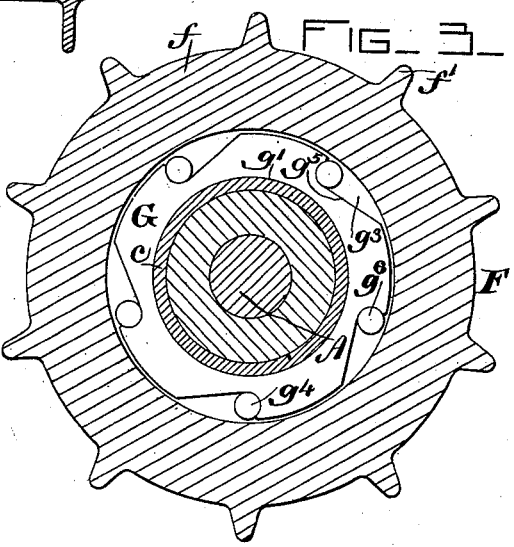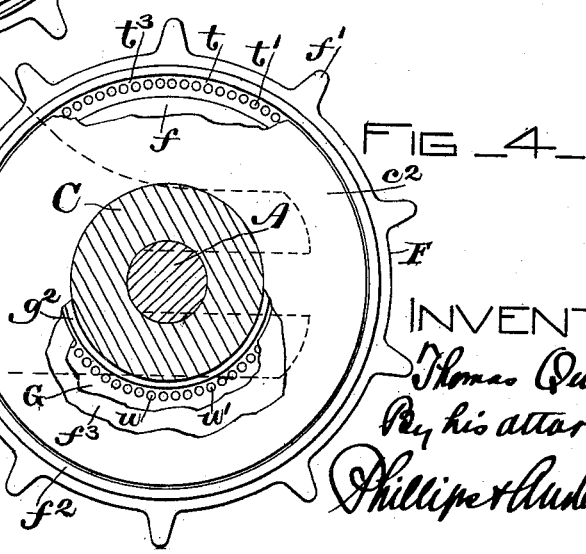

(No Model.) 2 Sheets—Sheet 2.

WITNESSES
C. Kitching.
A. Orne

INVENTOR
Thomas Quinn,
By his attorneys,
Phillips & Anderson.

UNITED STATES PATENT OFFICE.

THOMAS QUINN, OF MILFORD, MASSACHUSETTS, ASSIGNOR OF ONE-HALF TO JAMES H. NORTHROP, OF TUSTIN, CALIFORNIA.

WHEEL-CONTROLLING MECHANISM.

SPECIFICATION forming part of Letters Patent No. 691,663, dated January 21, 1902.

Application filed January 20, 1898. Serial No. 667,193. (No model.)

*To all whom it may concern:*

Be it known that I, THOMAS QUINN, a citizen of the United States, residing at Milford, in the county of Worcester and State of Massachusetts, have invented certain new and useful Improvements in Wheel-Controlling Mechanism; and I do hereby declare the following to be a full, clear, and exact description of the invention, such as will enable others skilled in the art to which it appertains to make and use the same.

The present invention relates to wheel-controlling mechanism for wheels or wheeled vehicles, and more particularly to wheeled vehicles which are propelled by the rider by cranks and similar devices and commonly known as "bicycles" and "tricycles."

The object of the present invention is to produce a wheel-controlling mechanism which shall be simple in construction and powerful in action and so arranged that the rider shall at all times have perfect control of the vehicle and can drive or propel the same along the highway or allow the vehicle to travel along by acquired momentum or by gravity, as in "coasting," without removing his hands or feet, as the case may be, from the propelling devices, and can through the instrumentality of such devices instantly retard or stop the advance of the vehicle as occasion may require.

To the above end the present invention consists of the devices and combination of devices which will be hereinafter set forth and claimed.

The present invention as applied to a bicycle is illustrated in the accompanying drawings, in which—

Figure 5:
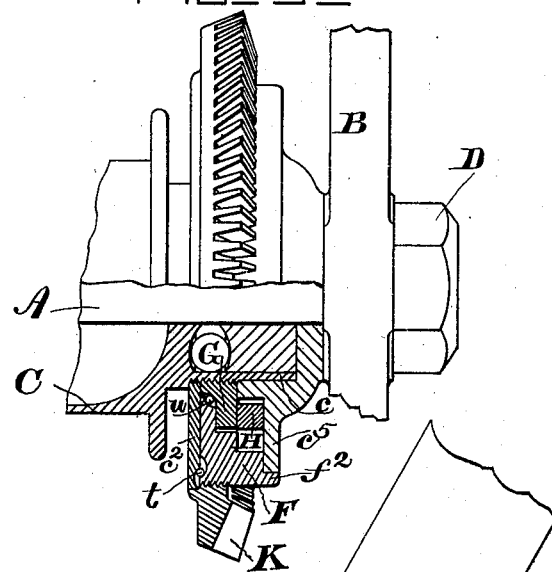
Figure 6:
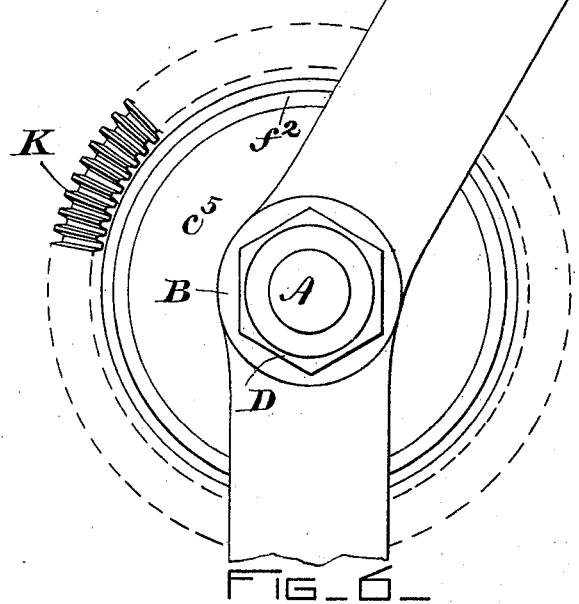

Figure 1 shows a longitudinal section through the hub of a chain-driven wheel embodying the same. Fig. 2 shows a section taken upon line $x$ $x$ in Fig. 1 looking toward the right. Fig. 3 shows a section taken upon the line $y$ $y$ in Fig. 1 looking toward the right. Fig. 4 shows a section upon line $z$ $z$, Fig. 1, looking toward the left, parts being broken out to show underlying construction. Figs. 5 and 6 show, in a partial sectional end elevation and side elevation, respectively, the present invention applied to a gear-driven wheel.

Similar letters of reference illustrate corresponding parts throughout the several views.

In the drawings, A represents an axle of a wheel which is fixedly secured in suitable bearings in the forks B of a bicycle-frame, and C is the hub of the wheel mounted to revolve on the axle A and secured thereon and in the forks B by nuts D and having the usual ball-bearings E, all of which parts, except as hereinafter described, may be of any usual or convenient construction and in themselves form no part of the present invention.

In the illustrated embodiment of the present invention the hub C is provided at one end with a projecting tubular sleeve $c$, which at its base is provided with an external threaded portion $c'$. A disk $c^2$, having a threaded aperture $c^3$, is turned upon the threaded portion $c'$ of the sleeve $c$ and seated firmly against a shoulder $c^4$ at the base of said sleeve $c$, as clearly shown in Fig. 1; but it is obvious that said disk $c^2$ may be formed integrally with the hub C and sleeve $c$, if desired. A second disk $c^5$ of substantially the same diameter as the disk $c^2$, having a central aperture $c^6$, through which the end of the axle A projects, and also having upon its inner surface a central depression $c^7$ and projecting flange $c^8$, forming a bearing to receive the end of the sleeve $c$, the internal diameter of said bearing being substantially equal to the external diameter of the sleeve $c$, is secured in position upon the sleeve $c$ when assembling the parts, as clearly shown in the drawings, and between these two disks $c^2$ and $c^5$ all parts of the wheel-controlling mechanism are located.

In the present invention the wheel propelling or driving element is so arranged that a rotation thereof in one direction will impart a forward motion to the wheel or vehicle, while a rotation or turning thereof in the opposite direction will bring into action a brake mechanism to stop the wheel, while if said wheel-driving element be held stationary or revolved in the direction of rotation of the wheel-hub at a slower speed than the speed of rotation of the hub the wheel may turn under the momentum acquired by its prior propulsion or under the action of gravity without the rider releasing his control of the wheel-driving element. In short, in the case of a bicycle or tricycle propelled by the usual cranks and pedals the rider may drive the wheel forward, brake and stop the same, or "coast" without removing his feet from the pedals.

The wheel-driving element in the invention of the drawings, as shown in Figs. 1 to 4, inclusive, consists of a sprocket-wheel F, and said wheel-driving element is normally loose on the hub C or the sleeve $c$ thereof and normally disconnected from the hub and the brake member, and suitable clutch devices are provided and so arranged that a rotation of the wheel-driving element from left to right or in the usual direction to cause a forward movement of the bicycle will automatically effect a connection between the wheel-driving element and the hub to turn the wheel, and a rotation thereof in the opposite direction or in a direction opposite to the direction of rotation of the hub and wheel will disengage the wheel-driving element from the hub and automatically connect the same with the brake and cause said brake to be forced into contact with a flange or suitable friction-surface fixedly secured to the hub of the wheel, thus retarding and stopping the wheel.

The wheel-driving element F comprises an annular ring $f$, which upon the outer circumference is provided with sprockets or teeth $f'$, arranged to be engaged by the links of a sprocket-chain, as is usual in bicycles and like vehicles. The ring $f$ is fitted between the disks $c^2$ and $c^5$, and, as shown in Fig. 1, is preferably provided with annular flanges $f^2$, which extend over the peripheries of the disks $c^2$ and $c^5$, thus effectually inclosing the mechanism and preventing the admission of dust and other foreign matter therein, and said ring $f$ has a flange $f^3$ projecting from its inner circumference for a purpose to be hereinafter described.

A convenient form of clutch mechanism between the wheel-driving element and the hub of the wheel consists of a notched or toothed clutch-collar G, which has an interiorly-threaded aperture $g'$, whereby said collar G is arranged to be secured onto the threaded portion $c'$ of the sleeve $c$, and the collar G is in the illustrated embodiment of the present invention provided with a boss or extension $g^2$ for a purpose to be hereinafter described. The notches $g^3$ in the clutch-collar G are preferably formed as shown in Fig. 3 of the drawings, each having an abrupt or slightly-curved shoulder, as shown at $g^4$, and an inclined base portion $g^5$, which extends outwardly to the periphery of said collar.

The inner diameter of the ring $f$ of the sprocket-wheel F is slightly greater than the diameter of the clutch-collar G, and when in position, as shown in the drawings, the ring $f$ and the notches $g^3$ form a series of pockets, in which are placed a series of balls or rollers $g^6$, as clearly shown in the drawings, said rollers or balls $g^6$ being of such size that when in the deepest portion of the notches $g^3$ they will just touch the inner face of the ring $f$.

The construction described is such that a forward rotation of the sprocket-wheel F will cause the balls or rollers $g^6$ to ride up the inclines $g^5$ of the notches $g^3$ and become wedged between said inclines and the inner face of the ring $f$, causing the sprocket-wheel F to become locked to the clutch-collar G, which, as before stated, is fixedly secured to the hub of the wheel, thus imparting a forward rotation to the wheel propelling or driving the vehicle.

When the sprocket-wheel is held from rotation or its speed is reduced relatively to the speed of the wheel and hub, the rollers or balls $g^6$ will recede down the inclines $g^5$ of the notches $g^3$ and release the clutch-collar G, permitting the wheel to move forward by its momentum or by gravity, thus permitting the rider to coast without removing his feet from the driving-pedals.

A backward rotation of the sprocket-wheel F relatively to the hub of the wheel will apply a braking friction to such wheel to effectually stop the forward travel thereof. In the present invention the braking device consists of a brake member which is arranged to frictionally engage some portion of the rotating hub of the wheel, as said brake member is actuated by the backward rotation of the sprocket-wheel, and said brake member is normally inactive and disconnected from said sprocket-wheel, and a suitable clutch device is arranged between the sprocket-wheel and the brake member whereby upon a backward rotation of the sprocket-wheel it will automatically be connected with the brake member and throw said brake member into action.

The brake member of the invention, as illustrated in the drawings, consists of a loose ring H, which is placed within the ring $f$ of the sprocket-wheel F and between the outer face of the clutch-collar G and the inner face of the disk $c^5$, resting upon the inwardly-projecting flange $c^8$ of said disk.

The clutch device or coupling between the sprocket-wheel and the brake member H is preferably similar to the clutch device between the sprocket-wheel and the hub, and consists of a series of notches $f^4$, formed in the outer face of the ring $f$ and along its inner edge, said notches $f^4$ being substantially like the notches $g^3$ formed in the clutch-collar G, but turned in the opposite direction, and in these notches $f^4$ are placed a series of balls or rollers $f^5$, which rest upon the periphery of the brake member H.

The above arrangement is such that a forward rotation of the sprocket-wheel F will cause the balls or rollers $f^5$ to seek the deepest part of the notches $f^4$, thus permitting the sprocket-wheel to turn loosely around the brake member; but upon a rotation of the sprocket-wheel in the reverse direction the balls or rollers $f^5$ will wedge between the inclined portions of the notches $f^4$ and the outer periphery of the brake member, thus locking the sprocket-wheel to the brake member and causing said brake member to move backwardly with the sprocket-wheel. It is designed that this backward turning of the brake member H shall cause said member to be brought into frictional engagement with some portion of the moving wheel or hub, and in the invention as illustrated said brake member is caused to engage the outer face of the clutch-collar G, which is fixedly secured to the hub C. To effect this result, the brake member H has upon its outer face suitable inclined notches $h$, which at one end have abrupt shoulders $h'$, the notches $h$ being engaged by suitable lugs or projections $c^9$, formed on the inner face of the disk $c^5$, the shoulders $h'$ acting to engage the lugs $c^9$ and prevent the forward turning of the brake member H, while the inclined surfaces of the notches $h$ will cause the brake member H to be moved laterally toward the outer face of the clutch-collar G and to be brought into close frictional engagement therewith, thus stopping the rotation of the wheel. In order to provide for a free relative rotation of the hub of the wheel and the sprocket-wheel F when the rider is coasting, in the illustrated embodiment of the present invention the sprocket-wheel F is supported by suitable ball-bearings, said bearings being so arranged that when the wheel is being driven or propelled forward by the rider said ball-bearings will be inactive, but will be brought into play whenever a relative rotation takes place, as in coasting. These ball-bearings are shown at $t$ and $u$ and comprise a series of balls $t'$ and $u'$, which are contained in suitable races or grooves $t^2$ and $t^3$, formed in the inner face of the flange $c^2$ and in the outer face of the ring $f$, and a groove $u^2$, formed in the inner surface of the flange $f^3$, and a bearing at the boss or extension $g^2$ of the clutch-collar G. By this arrangement of the bearings it will be noted that upon a forward or driving action of the sprocket-wheel F the bearings travel with said sprocket-wheel and hub, but when a relative rotation of the sprocket-wheel and hub occurs, as in coasting, said bearings will take up all friction between the sprocket-wheel and the parts of the hub.

In Figs. 5 and 6 the construction is the same in all essential particulars to that hereinbefore described, but showing a bevel-gear K substituted for the sprocket-wheel, such construction being employed in gear-driven vehicles—such, for example, as the so-called "chainless" bicycles.

As shown in the drawings, the invention is applied to the rear or driven wheel of the bicycle, and in operation power is applied to the wheel-driving element from the pedals and cranks by means of the usual chain or shaft and gearing. A forward rotation of the wheel-driving element will cause the clutch device to connect said wheel-driving element and the hub of the wheel and propel the same in a forward direction, thus moving the vehicle along. When the rider desires to coast, he manipulates the pedals to stop the wheel-driving element or move it forward at a relatively slower speed than the speed at which the hub is rotating, which disengages the wheel-driving element from the hub and permits the vehicle to move forward by its acquired momentum or by gravity. When it is desired to stop the advance of the bicycle, the rider by a backward movement of the pedals or "back-pedaling," as it is termed, causes the wheel-driving element to be moved backwardly or in a direction opposite to the direction of rotation of the hub, which causes the wheel-driving element to release the hub and to be connected with the brake member, imparting a backward rotation to such brake member and causing the lugs and inclines to force said brake member against a braking-surface on the moving hub or wheel to stop the same.

It is of course obvious that the illustrated embodiment of the present invention may be altered in various ways without materially changing its character and principle of operation—as, for example, the clutch devices may be formed by reversing the relative position of the notched and plain peripheries, or both groups of notches may be formed in the ring of the wheel-driving element, or said ring may be formed without notches and the notches be placed in both the collar G and the brake-member, said notches being formed to extend in opposite directions, as is obvious from the foregoing description.

I have in the foregoing specification and accompanying claims referred to a relative rotation of the brake member and its support or a rotation of the brake member, and by such terms I desire to be understood as referring to such limited relative turning of the brake member and its support as will cause such brake member to perform its braking function to retard the wheel.

Having fully described the construction and mode of operation of my invention, I claim as new and desire to protect by Letters Patent of the United States—

1. In a wheel-controlling mechanism, the combination with wheel driving and braking mechanisms, the braking mechanism comprising a brake member mounted on a fixed support, and arranged to have a limited rotation thereon, of a common rotating actuating device for the wheel-driving mechanism and the brake mechanism, normally disconnected therefrom, clutch devices controlled by the direction of rotation of the actuating device arranged to connect said device with either the wheel-driving mechanism or the brake member, to rotate the wheel, or to impart a limited rotation to the brake member on its fixed support, and complementary actuating-surfaces between the brake member and its support, to actuate the brake member to cause it to retard the wheel when the limited rotation is imparted thereto, substantially as described.

2. In a wheel-controlling mechanism, the combination with a wheel and its hub, of a brake member mounted on a fixed support and arranged to have a limited rotation with relation to its support, a common rotating actuating device for said wheel and brake member normally disconnected therefrom, clutch devices controlled by the direction of rotation of the actuating device to directly connect said device with either the hub of the wheel or the brake member, and complementary actuating-surfaces between the brake member and its support, arranged to actuate the brake member to cause it to retard the rotation of the wheel when the actuating device is turned in one direction, substantially as described.

3. In a wheel-controlling mechanism, the combination with a fixed support, of a brake member normally inactive and arranged to have a limited rotation with reference to said support, an actuating device normally disconnected from said brake member arranged to have a free rotation relative to said brake member in one direction, means to automatically connect the brake member and its actuating device for simultaneous rotation when the actuating device is rotated in an opposite direction, and complementary actuating-surfaces between the brake member and its support arranged to cause said brake member to engage a friction-surface to stop the wheel when so rotated, substantially as described.

4. In a wheel-controlling mechanism, the combination with a stationary disk and brake member normally sustained without rotation, of a friction-surface on the wheel, normally disconnected means for imparting a relative rotation to said disk and brake member, and lugs and inclined surfaces on said disk and brake member arranged to cause said brake member to engage said friction-surface on the wheel upon the relative rotation of said disk and brake member in one direction, substantially as described.

5. In a wheel-controlling mechanism, the combination with the wheel and its driving mechanism, of a brake member normally disconnected therefrom and normally held from rotation therewith, a clutch to connect said brake member with the wheel-driving mechanism, and means to move said brake member laterally to engage a friction-surface on the wheel, substantially as described.

6. In a wheel-controlling mechanism, the combination with wheel-driving mechanism, of braking mechanism including a laterally-movable brake member and means to move it laterally, and a common actuating device for said mechanisms normally disconnected therefrom, substantially as described.

7. In a wheel-controlling mechanism, the combination with wheel driving and braking mechanisms, said braking mechanism comprising a braking-surface on the hub of the wheel and a laterally-movable brake member normally held from rotation and arranged to engage said braking-surface, of a common actuating device for said driving and braking mechanisms, substantially as described.

8. In a wheel-controlling mechanism, the combination with wheel driving and braking mechanisms mounted and acting upon the hub of the wheel, said braking mechanism comprising a braking-surface on the hub of the wheel, a brake member arranged to be moved laterally into engagement therewith, and means for moving the brake member laterally, of a common actuating device for said mechanisms normally disconnected therefrom, and clutch devices controlled by the direction of rotation of the actuating device to connect said device with either the driving mechanism or the braking mechanism, substantially as described.

9. In a wheel-controlling mechanism, the combination with a fixed support, of driving and braking mechanisms, said braking mechanism comprising a braking-surface on the hub of the wheel, a brake member mounted on the fixed support and arranged to have lateral movement thereon to engage said braking-surface, and means for moving the brake member laterally, and a common actuating device for said mechanisms, substantially as described.

In testimony whereof I affix my signature in presence of two witnesses.

THOMAS QUINN.

Witnesses:
T. HART ANDERSON,
A. E. WHYTE.